Jan. 13, 1942.   H. L. MORRIS   2,270,077
LUBRICATING ARRANGEMENT FOR CLUTCH PILOT BEARINGS
Filed July 19, 1939
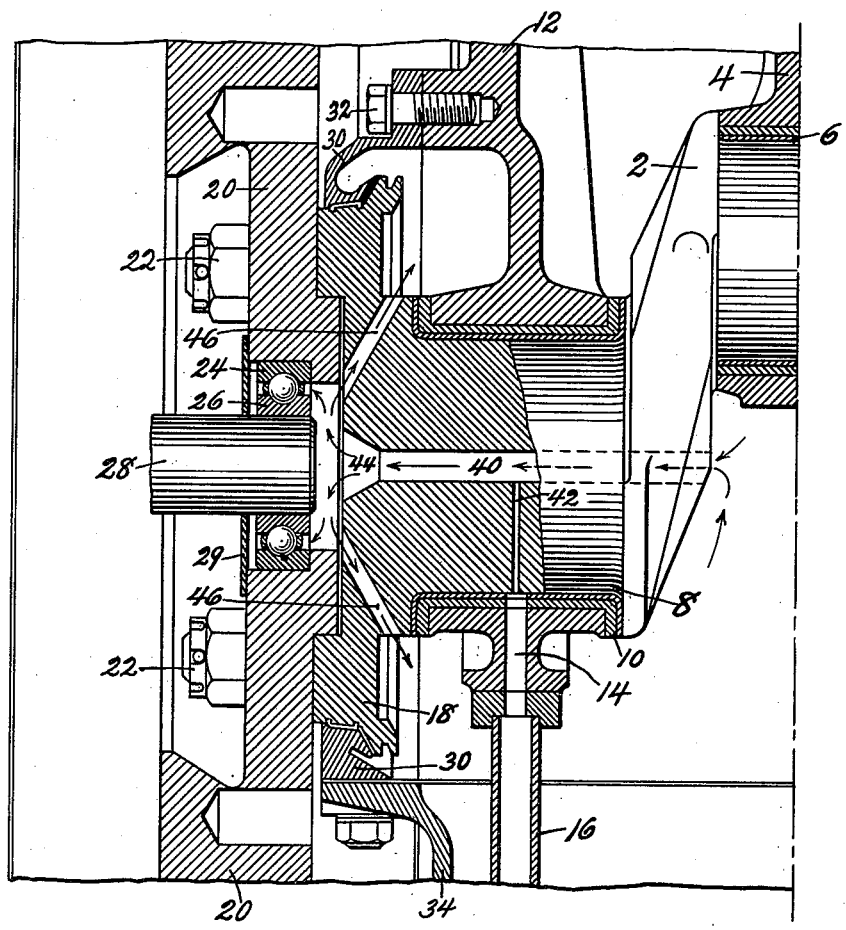
INVENTOR
Harold L. Morris
BY
Donald U. Rich
ATTORNEY Patented Jan. 13, 1942

2,270,077

UNITED STATES PATENT OFFICE 2,270,077

LUBRICATING ARRANGEMENT FOR CLUTCH PILOT BEARINGS

Harold L. Morris, Berkeley, Calif., assignor to American Car and Foundry Motors Company, New York, N. Y., a corporation of Delaware Application July 19, 1939, Serial No. 285,312

6 Claims. (Cl. 184—6)

This invention relates to lubricating systems in general and in particular to such systems for the lubrication of the clutch pilot bearings of motor vehicles.

In the past the clutch pilot bearings have been lubricated by various types of pressure systems, but with any pressure system there is always the danger of over-lubrication and in case the lubricant is applied manually there is always the danger of neglect, with the result that the bearing is never lubricated. Recently attempts have been made to lubricate the clutch pilot bearing by means of oil taken from the engine pressure system, but this light oil applied under pressure to the pilot bearing invariably leaked past the bearing onto the clutch surfaces, thereby resulting in slippage of the clutch. It is an object, therefore, of the present invention to provide proper lubrication at all times for the pilot bearing yet without danger of over-lubrication.

A further object of the invention is the provision of an arrangement for lubricating clutch pilot bearings by means of an oil spray taken from the engine crank case.

A still further object of the invention is the provision of an engine crank shaft with a fan built therein at one end to force an oil spray from the crank case to the pilot bearing while at the same time ventilating the bearing.

These and other objects of the invention will be apparent to persons skilled in the art from a study of the following description and the accompanying drawing which is a sectional view taken substantially on the center plane of the rear main bearing:

Referring now to the drawing in particular, it will be seen that the engine crank shaft 2 is of conventional design and will be driven by the pistons through the connecting rod 4 rotatably mounted on the crank shaft by means of bearings 6. The crank shaft is provided with any suitable number of main bearings but, for the present purpose, only the rear main bearing 8 is shown. This is supported by means of bearing material 10 bearing upon the supporting structure 12 rigidly carried by the engine block. The supporting structure and bearing material is drilled in order to provide passage 14 adapted to receive oil from the pressure supply line 16 in the usual manner, thus supplying an ample flow of oil to the rear main bearing.

The end of the crank shaft is enlarged as at 18 to provide a disc-like portion to which the fly wheel 20 may be secured by any suitable means, such as bolts 22. This fly wheel, as is customary, forms a portion of the clutch structure and is provided at its center with a cavity adapted to receive outer race 24 of a ball bearing assembly, the inner race 26 of which supports the shaft 28 forming part of the clutch and transmission assembly. A sealing plate 29 is secured to the fly wheel and closely engages the shaft 28, thereby preventing any possible discharge of oil from the ball bearing to the clutch space. The rim of the disc-like enlargement 18 has its outer surface formed with grooves and ledges adapted to cooperate with similarly formed portions on a sealing disc 30 bolted or otherwise secured as at 32 to the engine block, thereby forming a labyrinth seal preventing escape of oil from the crank case 34, which is bolted as is customary to the block.

In order to supply lubricant to the pilot bearing space a relatively large axial bore 40 is made through the main bearing portion of the crank shaft and intersects the inner end of a small radial passage 42 drilled through the main bearing of the crank shaft and adapted to register with the passage 14 in the bearing structure, thus permitting an extremely small amount of oil to be forced up into the axial passage during each revolution of the crank shaft. The inner end of the crank shaft axial passage is enlarged as at 44 in order to draw the oil droplets, which cling to the passage walls, outwardly toward the ball bearing structure. A flow of oil spray and droplets from the crank case through the axial passage is obtained by drilling any suitable number of inclined radial passageways 46 through the enlarged end of the crank shaft. These inclined radial passageways will act as a centrifugal pump drawing air with its finely suspended oil particles from the crank case through the axial passage toward the pilot bearing and out through the passageways to the crank case. At low speeds of the engine, when the pilot bearing is normally receiving its greatest amount of use, the pump action of the passageways is insufficient to properly lubricate the bearing. Under such operation the oil injected through small radial bore 42 will be drawn by the air current toward the pilot bearing, thus properly lubricating the same. At high speeds of operation this small radial bore will, of course, still be injecting oil into the passageway, but the strong air flow through the passageway and by the pilot bearing will carry out all excess oil and in any case there can be no pressure greater than atmospheric in the pilot bearing cavity. In fact, there is a slightly lower than atmospheric pressure existing in the pilot bearing cavity, thus any oil which tends to escape past the sealing plate 29 is drawn inward by the pump action, thus the pump or fan action of the passageways not only thoroughly lubricates the bearing, but assists in preventing escape of lubricant from the pilot bearing cavity into the clutch mechanism. The degree of pressure in the pilot bearing cavity is, of course, controlled by the size of the axial passage 40 and by the number of inclined radial passages 46 as well as by the speed of the engine, but in any case the pressure in such cavity will always be slightly lower than atmospheric.

Although the lubricating arrangement shown by the drawing has been described more or less in detail, it is obvious that various modifications and rearrangements of parts will be possible to those skilled in the art and all such modifications and rearrangement of parts are contemplated as will fall within the scope of the appended claims which define my invention.

What is claimed is:

1. In combination, a driving member, a first clutch element secured thereto, a second clutch element, a pilot bearing carried by said first clutch element and rotatably supporting said second clutch element, and fan means for passing a lubricant spray over said pilot bearing, said fan means being formed by an axial bore extending from the crank case interior through a part of said driving member and terminating in an enlarged open end portion adjacent said pilot bearing and there communicating with substantially radial passages formed in said driving member and opening into said crank case interior.

2. In a lubricating arrangement, the combination of an engine crankcase, a crankshaft mounted therein, a rear main bearing supporting the crankshaft, a first clutch element secured to said crankshaft, a second clutch element, a pilot bearing mounted in a cavity in said first clutch element and rotatably supporting said second clutch element, an axial bore in said crankshaft and connecting said cavity with said crankcase interior, and substantially radial passages through said crankshaft and connecting said cavity with said crankcase interior, said radial passages nd axial bore constituting fan means to circulate lubricant spray from the crankcase interior over the pilot bearing and back to the crankcase interior.

3. In a lubricating arrangement, the combination of an engine crankcase, a crankshaft mounted therein, a rear main bearing supporting the crankshaft, a first clutch element secured to said crankshaft, a second clutch element, a pilot bearing mounted in a cavity in said first clutch element and rotatably supporting said second clutch element, an axial bore in said crankshaft and connecting said cavity with said crankcase interior, and substantially radial passages through said crankshaft and connecting said cavity with said crankcase interior, said radial passages acting as a fan to draw lubricant spray from the crankcase interior over the pilot bearing and to maintain sub-atmospheric pressure in said cavity.

4. In a lubricating arrangement for pilot bearings, the combination of a driving member, a clutch element secured thereto, a second clutch element, a pilot bearing carried by said first named clutch element and rotatably supporting a portion of said second clutch element, and fan means comprising intercommunicating axial and inclined radial passages opening at their remote ends into the crank case interior and formed in said driving member, said fan means maintaining a sub-atmospheric pressure at the bearing thereby preventing escape of lubricant to said clutch elements.

5. In a lubricating arrangement for pilot bearings, the combination of a driving member, a clutch element secured thereto, a second clutch element, a pilot bearing carried by said first named clutch element and rotatably supporting a portion of said second clutch element, and fan means comprising intercommunicating axial and inclined radial passages opening at their remote ends into the crank case interior and formed in said driving member, said fan means maintaining a sub-atmospheric pressure at the bearing and also passing lubricant spray from the crank case interior over said pilot bearing to lubricate the same.

6. In a lubricating arrangement for pilot bearings, the combination of a driving member, a clutch element secured thereto, a second clutch element, a pilot bearing carried by said first named clutch element and rotatably supporting a portion of said second clutch element, and fan means for passing a lubricant spray from the crank case interior over said pilot bearing formed in part by an axial bore extending through a part of said driving member from the interior of the crank case, and in part by other passages arranged in cooperative communication with said axial bore at one end and in communication with the crank case at their other ends, said axial bore being formed with an enlarged end portion adjacent said pilot bearing and forming a hub of the fan means.

HAROLD L. MORRIS.